United States Patent [19]

Dines et al.

[11] 4,308,171

[45] Dec. 29, 1981

[54] METHOD OF PREPARING DI AND POLY CHALCOGENIDES OF GROUP VIIB BY LOW TEMPERATURE PRECIPITATION FROM NONAQUEOUS SOLUTION AND SMALL CRYSTALLITE SIZE STOICHIOMETRIC LAYERED DICHALCOGENIDES OF RHENIUM AND TECHNETIUM

[75] Inventors: Martin B. Dines, Santa Ana, Calif.; Russell R. Chianelli, North Branch; Theresa A. Pecoraro, Middletown, both of N.J.

[73] Assignee: Exxon Research & Engineering Co., Florham Park, N.J.

[21] Appl. No.: 169,425

[22] Filed: Jul. 16, 1980

Related U.S. Application Data

[63] Continuation of Ser. No. 37,372, May 9, 1979, abandoned, which is a continuation of Ser. No. 797,013, May 16, 1977, abandoned.

[51] Int. Cl.$^3$ ................ B01J 31/32; B01J 27/02; C01B 19/00; C01B 17/00
[52] U.S. Cl. ................ 252/430; 252/25; 252/428; 252/439; 252/518; 423/509; 423/561 R; 585/469; 501/40
[58] Field of Search ........... 252/439, 428, 430; 423/561 R, 508, 509; 208/215; 106/47

[56] References Cited

U.S. PATENT DOCUMENTS

| | | | |
|---|---|---|---|
| 1,948,408 | 2/1934 | Watts et al. | 208/143 |
| 2,145,657 | 1/1939 | Ipatieff et al. | 208/215 |
| 2,354,742 | 8/1949 | Cunningham | 423/509 |
| 2,448,740 | 9/1948 | Schwartz | 252/313 |
| 2,647,858 | 8/1953 | Weisz | 208/195 |
| 2,654,696 | 10/1953 | Laporte | 196/78 |
| 2,805,917 | 9/1957 | Nitsche | 423/509 |
| 3,026,175 | 3/1962 | Kulifay | 423/509 |
| 3,140,994 | 7/1964 | Derr, Jr. et al. | 208/254 |
| 3,161,585 | 12/1964 | Gleim et al. | 208/264 |
| 3,252,895 | 5/0000 | Gleim | 208/264 |
| 3,291,720 | 12/1966 | Dobres et al. | 208/89 |
| 3,306,701 | 2/1967 | Anderson et al. | 423/509 |
| 3,320,157 | 5/1967 | Arey, Jr. et al. | 423/561 R |
| 3,331,769 | 7/1967 | Gatsis | 208/210 |
| 3,336,386 | 8/1967 | Dovell et al. | 260/576 |
| 3,338,822 | 8/1967 | Groszek et al. | 208/310 |
| 3,453,217 | 7/1969 | Kozlowski et al. | 252/430 |
| 3,509,213 | 4/1970 | Greenfield et al. | 252/439 |
| 3,538,161 | 11/1970 | Dovel | 260/576 |
| 3,538,162 | 11/1970 | Dovell | 252/439 |
| 3,622,497 | 11/1971 | Gleim | 208/108 |
| 3,688,109 | 8/1972 | Gamble | 260/429 R |
| 3,714,339 | 1/1973 | Vecht | 423/509 |
| 3,763,043 | 10/1973 | Thomson | 252/31 |
| 3,766,064 | 10/1973 | Gamble | 252/25 |
| 3,793,081 | 2/1974 | Varga | 136/86 |
| 3,840,389 | 10/1974 | Kobylinski | 423/561 R |
| 4,009,052 | 2/1977 | Whittingham | 429/191 |
| 4,055,630 | 10/1977 | McCoy et al. | 423/509 |

FOREIGN PATENT DOCUMENTS 728913 of 1932 France.
2034431 of 1969 France.
358180 11/1931 United Kingdom.
362354 11/1931 United Kingdom.
1471589 of 1974 United Kingdom.

OTHER PUBLICATIONS

Chem. Abs.–vol. 28 (1934), #2634.
"Colloidal Sulpher Compounds of Ruthenium", F.M. Jaeger & J. H. De Boer, Proc. Acad. Sci. Amster, (1920), pp. 95–102.
"Preparation & Crystallinity of Molybdenum & Tungsten Compounds", J. C. Wildervanck & F. Jellinck-Zeitshrift Fur Anorganishe Und Allgemene Chemie Band 328 (1964).
"The Synthesis & Characterization of Inorganic Compounds", W. J. Jolly, Prentice Hall Inc., N.J., Chapt. 5, pp. 97–121.
Chem. Abs., vol. 85 (1976): 152239–C, Larchev V.I. & Popva S.V.
"The Synthesis & Characterization of Inorganic Compounds", Prentice-Hall Inc.; W. L. Jolly–Chapter 5–Solvents.
Extractive Metalurgy (vol. 2), Habashi Science Publishers–Paris–p. 216.
4,208,394 06001980 Chianelli 423 561
"Preparation of Metal Sulphides from Organic Solvents", Lutz & Haeuseler Z. Naturforsch 26 b, 1096–1097 (1971).

"Preparation of Chromium Sulphide from Organic Solvents", Lutz, Haeuseler and Becker, Z. Naturforsch 29 b, 385–388 (1974).
Die Darstellung von Seleniden aus Selenuasserstuff und Metallsalzlosungen Moser und Atynski, Monatsh 54, pp. 235–250 (1925).
Formation of Chromium (III) Sulfide, Veller., Ukrain Chem. Zhur 11 (8) pp. 23–27 (1936).
"A Study in Tellurides", Tibbals, J. Am. Chem. Soc. 31, pp. 902–913 (1909).
"Application of Selenium Salts in Inorganic Analysis", Taimni and Rakshpal, Analytica Chemica. Acta 25, pp. 438–447 (1961).
Comprehensive Treatise on Inorganic and Theoretical Chemistry, vol. IX, pp. 814–818, Mellor.
"Die Darstellung von Metalltelluriden aus Tellurwasserstuff and Metallsalzlosungen", Brukl, Monatsh 45, pp. 471–484 (1925).
"Comprehensive Treatise on Inorganic and Theoretical Chemistry, vol. VII, Mellor, pp. 90–91.
"La Combinaison RuS$_2$, et Sa Structure", DeJong and Haog, Rec. Trav. Chim. 46, pp. 173–176 (1927).

*Primary Examiner*—P. E. Konopka
*Attorney, Agent, or Firm*—Joseph J. Allocca

[57] ABSTRACT

Finely divided, small particle (0.1 micron or less) small crystallite (about 50 Å × 100 Å or less) chalcogenides of manganese, rhenium and technetium are described. These compositions are prepared by mixing the absence of an aqueous solvent, a manganese, rhenium or technetium salt with a source of chalcogenide yielding a precipitate. The manganese, rhenium or technetium salt and the source of chalcogen can be mixed either neat or in the presence of a nonaqueous aprotic solvent. The precipitate which results before removal of the anion salt is a finely divided product. In the case of rhenium dichalcogenide the product possesses a layered structure. The anion salt may be removed by any technique common to the art, pumping under vacuum being one such technique, washing with a suitable solvent being another.

A method is described for the preparation of di- and poly-chalcogenides of the formula $MX_y$ wherein M is a metal selected from the group consisting of manganese, rhenium and technetium, X is a chalcogen selected from the group consisting of sulfur, selenium, tellurium and mixtures thereof, and y is a number ranging from about 1.5 to about 4, preferably about 2, comprising the low temperature, nonaqueous precipitation of said $MX_y$ compounds from mixtures of the salts of said manganese, rhenium and technetium. Said precipitation occurs in the absence of aqueous solvents. The process of the instant invention permits the preparation of materials uncontaminated by water, oxygen or hydrolysis products.

28 Claims, 2 Drawing Figures

X-RAY COMPARISON OF CRYSTALLINE TRICLINIC $ReS_2$ WITH PARACRYSTALLINE $ReS_2$

METHOD OF PREPARING DI AND POLY CHALCOGENIDES OF GROUP VIIB BY LOW TEMPERATURE PRECIPITATION FROM NONAQUEOUS SOLUTION AND SMALL CRYSTALLITE SIZE STOICHIOMETRIC LAYERED DICHALCOGENIDES OF RHENIUM AND TECHNETIUM

This is a continuation of application Ser. No. 37,372, filed May 9, 1979, now abandoned, which is a continuation of Ser. No. 797,013, filed May 16, 1977, now abandoned.

FIELD OF THE INVENTION

Finely divided, high surface area, small particle (0.1 micron or less) small crystallite (about $50\text{Å} \times 100\text{Å}$ or less) chalcogenides of manganese, rhenium and technetium are described. These compositions are prepared by mixing, in the absence of an aqueous solvent, a manganese, rhenium or technetium salt, preferably rhenium salt, with a source of chalcogen yielding a precipitate. The manganese, rhenium or technetium salt and the source of chalcogen can be mixed either neat or in the presence of a nonaqueous solvent. The precipitate which results before removal of the anion salt is a finely divided product. In the case of rhenium dichalogenide the product possesses a layered structure. The anion salt may be removed by any technique common to the art, pumping under vacuum and washing with a suitable solvent being examples.

A method is also described for the preparation of di and poly chalcogenides of the formula $MX_y$ wherein M is selected from the group consisting of manganese, rhenium and technetium, preferably rhenium, X is a chalcogen selected from the group consisting of sulfur, selenium, tellurium and mixtures thereof, and y is a number ranging from about 1.5 to about 4, preferably about 2, which method comprises preparing a neat or non-aqueous reactive solution or slurry wherein is added, (1) a manganese, rhenium or technetium salt, the anion of the salt preferably selected from the group consisting of halide, acetate, carboxylate, perfluorocarboxylate, nitrate, acetylacetonate, hexafluoroacetylacetonate, and sulfate, most preferably chloride and (2) a source of sulfide, hydrosulfide ($HS^-$), selenide, telluride ions and mixtures thereof, said source being selected from the group consisting of $Li_2X$, $K_2X$, LiHX, KHX, NaHX, $NH_4HX$, $(NH_4)_2X$, $Na_2X$, $(RNH_3)_2X$, $(R,R'NH_2)_2X$, $(R,R'R''NH)_2X$, wherein R,R'R" are the same or different and are selected from the group consisting of $C_1$-$C_{20}$ alkyl, $C_6$-$C_{20}$ aryl, preferably $C_1$-$C_8$ alkyl, $C_6$-$C_{12}$ aryl and X is a chalcogen selected from sulfur, selenium, tellurium and mixtures thereof, preferably sulfur and selenium, most preferably sulfur. The reaction may be run neat, that is, in the absence of any added solvent. Alternatively, a nonaqueous solvent may be utilized and if used at all, is selected from the group consisting of ethers having 4 to 8 carbons, acetonitrile, benzonitrile, pyridine, propionitrile, N-methylformamide, dimethylformamide (DMF), 1,2-dimethoxyethane (DME), propylene carbonate, ammonia, aromatics of 6-20 carbons, preferably $C_6$-$C_{12}$, molten sulfur, sulfur dioxide, diglyme, ethylacetate, esters of from $C_4$ to $C_5$, sulfolane, dimethylsulfite, tributylphosphate, $C_1$-$C_{30}$ amines, preferably $C_1$ to $C_{20}$, $C_5$-$C_{12}$ alkanes, preferably $C_6$-$C_8$, anhydrous acids such as formic, glacial acetic, alkyl halides of from 1 to 20 carbon atoms, aryl halides of from $C_6$ to $C_{20}$ wherein the halide is selected from the group consisting of Cl, Br, and I. Tetrahydrofuran (THF), ethylacetate, dimethylformamide (DMF), chlorobenzene, chloroform, pyridine, propylene carbonate and acetone may be used as solvents of choice.

The reaction proceeds spontaneously upon mixing at low temperature, preferably less than 400° C., and at atmospheric pressure. The products may be isolated by filtration and washing using excess solvent (when solvent is used) or by pumping off the anion salt if it is volatile. The products obtained by the above method are di- and poly-chalcogenides and stoichiometric dichalogenides. The technetium dichalcogenide and rhenium dichalcogenide possess a layered structure and also are unique because of their small crystallite size (about $50\text{Å} \times 100\text{Å}$ or less) and small particle size (0.1 micron or less) which distinguishes them from compounds of the prior art and makes them compounds of choice. The manganese dichalcogenide possesses a pyrite structure or an MnS structure depending upon condition of preparation.

PRIOR ART

The Group VIIb di- and poly-chalcogenides ($MX_y$ wherein M is manganese, rhenium and technetium, X is sulfur selenium and tellurium and y is 2 or greater) have traditionally been prepared, when preparation was possible at all, by high temperature solid state techniques, or by aqueous preparation methods which results in compounds possessing a high degree of trapped water and hydrolysis products. The di- and poly-chalcogenides have attracted great interest because of their highly anisotropic properties and intercalation properties. Intercalates made using various metal chalcogenides are useful as lubricants, battery cathodes and superconductors. (See Gamble et al, U.S. Pat. No. 3,766,064 herein incorporated by reference). However, a major drawback in the use of chalcogenides is the difficulty encountered in their preparation.

$ReS_2$ is normally prepared by the thermal decomposition of $Re_2S_7$, see *J. Less Common Metals* 24, 73-81, 1971. $Re_2S_7$ is itself prepared by treating said perrhenate solutions with gaseous $H_2S$. The brown precipitate which results is washed and dried over $P_2O_5$ or silica gel. The product obtained contains excess sulfur and water. $Re_2S_7$ is amorphous to X-ray. This material is thermally decomposed. At 400°-450° C. the product is still rich in excess sulfur and has a composition of about $ReS_{2.4}$. Crystalline layered $ReS_2$ which is obtained only at temperatures over 1100° C. are no longer amorphous to X-ray, possessing well developed crystallite structures and large particle sizes. A similar situation prevails for $TcS_2$.

By the low temperature nonaqueous precipitation technique of the instant invention, finely divided, small crystallite ($50\text{Å} \times 100\text{Å}$ or less) small particle (0.1 micron or less) stoichiometric $ReX_2$ and $TcX_2$, wherein X is selected from the group consisting of sulfur, selenium and tellurium, preferably sulfur, is prepared. By using a $Re^{+4}$ salt (such as $ReCl_4$), $ReS_2$ free from water, excess sulfur and hydrolysis products may be prepared at temperatures ranging from below room temperature to 400° C. Furthermore, preparation in nonaqueous solvents and workup under dry nitrogen insures no oxygen contamination of the products. Low temperature precipitation of solids from nonaqueous solution or from neat reactions also has advantage of low cost and permits preparation of materials of composition and properties not accessible by other means. See also Ser. No. 641,424 filed Dec. 17, 1975, herein incorporated by reference.

BRIEF DESCRIPTION OF THE DRAWINGS

FIG. I compares the x-ray patterns of $ReS_2$ prepared by a prior art technique and the non-aqueous technique of the instant invention.

FIG. II shows the amount of $ReS_2$ absorbed on an MgO support in relation to the $ReS_2$ in the non-aqueous dispersion.

Figure 1:
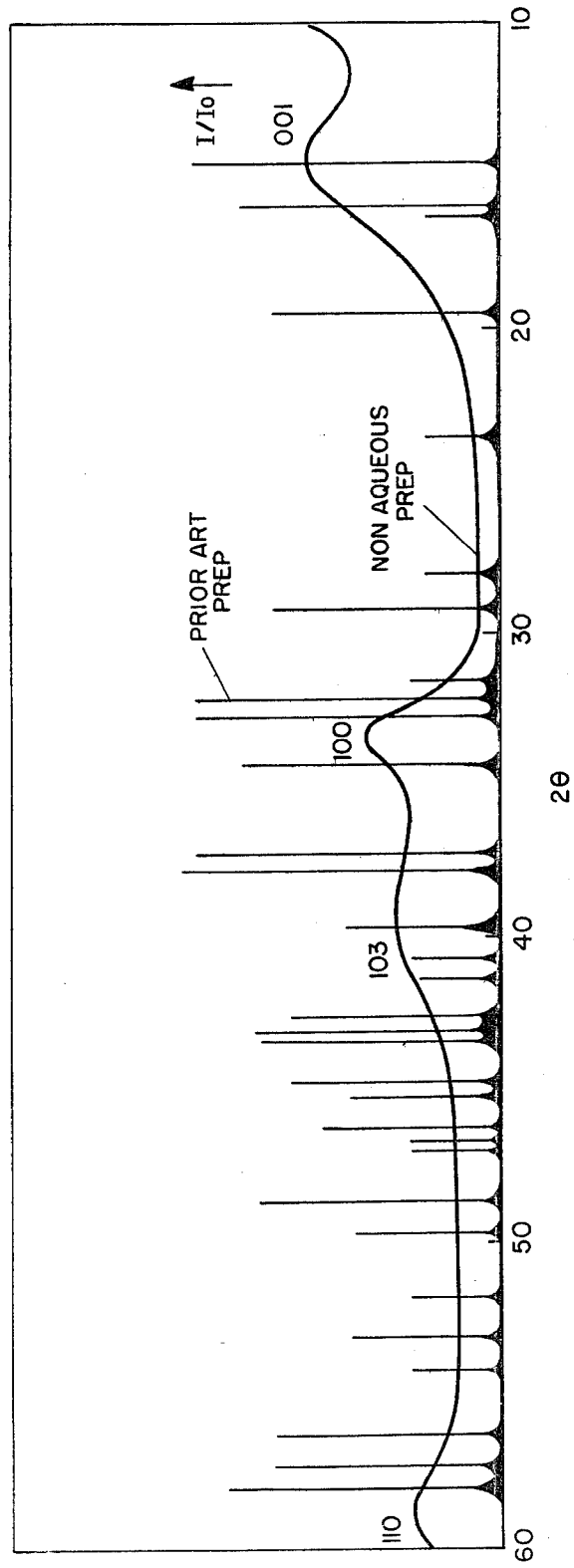
Figure 2:
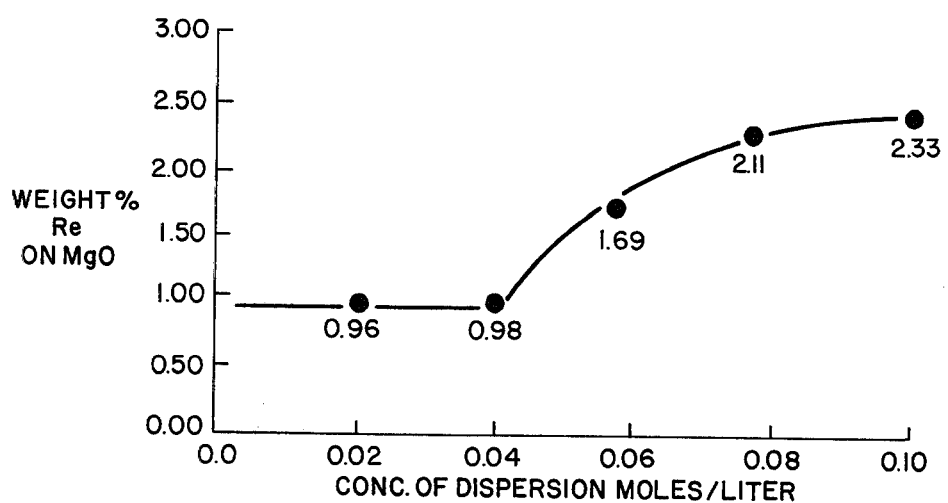

The stoichiometric rhenium and technetium dichalcogenides prepared by the nonaqueous precipitation technique of the instant process are finely divded small composite particles or completely noncrystalline. They possess crystallite sizes of $50Å \times 100Å$ or less, and particle size of 0.1 micron (1000 Å) or less, preferably less than 0.05 micron (500 Å), that is, particulate material which is amorphous to X-ray diffraction, see "X-Ray Diffraction by Polycrystalline Materials", Ed. H. S. Stokes, H. P. Rooksby and A. J. C. Wilson, Chapter 17, A. R. Stokes, p. 409, 1955, Pub. J. Wright, London. FIG. I is an X-ray comparison of crystalline triclinic $ReS_2$ with paracrystalline $ReS_2$. The sharp X-ray pattern is that of $ReS_2$ prepared by prior art technique while the broad pattern is that of $ReS_2$ prepared by the nonaqueous precipitation technique described in the instant specification. From the figure it can be seen that the two materials are dramatically different physically. In regions where the prior art compounds give a sharp pattern, the compound of the instant invention does not exhibit any variation in signal intensity at all.

Particles of 0.05 micron (500Å) or less exhibit blurred X-ray patterns or no X-ray pattern at all (amorphous). Crystallite sizes of $50Å \times 100Å$ are determined by use of a scanning electron microscope (SEM). Layered stoichiometric rhenium dichalcogenide and technetium dichalcogenide obtained by prior art high temperature synthesis techniques produce X-ray patterns and therefore, cannot be finely divided or of small particle or crystallite size. In addition Re sulfides prepared below 400° C. by aqueous methods are never stoichiometric and are always of the type $ReS_{2+x}$.

SUMMARY OF THE INVENTION

Finely divided, small particle (0.1 micron [1000Å] or less, preferably less than 0.05 micron) small crystallite (about $50Å \times 100Å$ or less) layered stoichiometric rhenium dichalcogenides and technetium dichalcogenides are described. The chalcogen is selected from the group consisting of sulfur, selenium, tellurium and mixtures thereof, preferably sulfur and selenium, most preferably sulfur. These layered stoichiometric rhenium and technetium dichalcogenides are prepared by the low temperature nonaqueous precipitation of said material from solutions comprising mixtures of the salts of rhenium and technetium, typical anions of the salts being halide (preferably chloride), acetate, carboxylate, perfluorocarboxylate, acetylacetonate, hexafluoroacetonate, sulfate and nitrate with solutions of or slurries of sources of sulfide, selenide, telluride ions and mixtures thereof, preferably sulfide and selenide, most preferably sulfide. The layered products of the low temperature nonaqueous precipitation technique are distinguished from materials prepared by high temperature (greater than 400° C.) methods of the prior art by exhibiting markedly different surface areas, particle sizes and crystallinity characteristics (as demonstrated by X-ray, see FIG. I). Furthermore, stoichiometric layered rhenium and technetium dichalcogenide cannot be prepared by prior art methods which operate below 400° C.

A method is also described for the synthesis of di- and poly-chalcogenides of Group VIIb which comprises preparing a nonaqueous reactive solution or slurry wherein is added, (1) manganese, rhenium or technetium salt, preferably rhenium salt, the salt anion being selected from the group consisting of halide, acetate, carboxylate, perfluorocarboxylate, acetylacetonate, hexafluoroacetylacetonate and, (2) a source of sulfide, selenide, telluride ions and mixtures thereof, preferably sulfide and selenide, most preferably sulfide, said sources conveniently being $K_2X$, $KHX$, $Li_2X$, $LiHX$, $Na_2X$, $NaHX$, $(NH_4)_2X$, $(NH_4)HX$, $(RNH_3)_2X$, $(RR'NH_2)_2X$, $(RR'R''NH)_2X$ wherein R,R'R" are the same or different and are selected from the group consisting of $C_1$–$C_{20}$ alkyl, preferably $C_1$ to $C_8$ or $C_6$–$C_{20}$ aryl, preferably $C_6$ to $C_{12}$, and wherein X is a chalcogen selected from the group consisting of sulfur, selenium, tellurium and mixtures thereof, preferably sulfur and selenium, most preferably sulfur, and a nonaqueous solvent selected from the group consisting of ethers of from $C_4$ to $C_8$, acetonitrile, benzonitrile, dimethylformamide (DMF), propylene carbonate, aromatics of $C_6$–$C_{20}$ carbons, preferably $C_6$ to $C_{12}$, ammonia, molten sulfur, diglyme, sulfur dioxide, ethylacetate, esters of from $C_4$ to $C_8$, sulfolane, tributylphosphate, anhydrous acids, such as formic acid, glacial acetic acid, alkylhalides of from $C_1$ to $C_{20}$, preferably $C_1$ to $C_5$ and arylhalides of from $C_6$ to $C_{20}$, preferably $C_6$ to $C_{20}$, pyridine, propionitrile, N-methylformamido, dimethylsulfite, $C_1$–$C_{30}$ amines, preferably $C_1$ to $C_{20}$, $C_5$–$C_{12}$ alkanes, preferably ($C_5$–$C_8$). The solvents of choice are tetrahydrofuran (THF), dimethylformamide (DMF), chlorobenzene, chloroform, pyridine, ethylacetate, propylene carbonate and acetone. Alternatively, the reaction may be run neat, that is, in the absence of any solvent. The reaction proceeds spontaneously upon mixing at low temperature, preferably less than 400° C. but greater than −78° C., and at atmospheric pressure. The products may be isolated by filtering, washing with excess solvents or by pumping off the anion salts if they are volatile. In situations wherein the sulfide, selenide and/or telluride ions sources are already solutions, no additional solvent is needed during the course of the reaction although a volume of nonaqueous solvent (i.e. one which does not offer or accept protons) may be added so as to facilitate product isolation.

The instant invention relates to the low temperature (−78° C. to 400° C.) precipitation from nonaqueous solution of finely divided, high surface area small particle (0.1 micron or less) small crystallite (50Å or 100Å or less) layered stoichiometric rhenium or technetium dichalcogenides and more generally to a method for the preparation of Group VIIb di- and poly-chalcogenides, in particular, the sulfide and most particularly, the disulfides and in the case of rhenium and technetium the layered dichalcogenide, in particular; the layered disulfide.

Typically, a metal salt such as $ReCl_4$ is reacted with a solution of, or a slurry of a convenient sulfide selenide or telluride ion source. Typical preferred sources of such ions for the reaction, in general, are $Li_2S$, $LiHS$, $KHS$, $NH_4HS$, $NaHS$, $(NH_4)_2S$, $Na_2S$, $(RNH_3)_2S$, $K_2S$, $(R,R'NH_2)_2S$, $(R,R',R''NH)_2S$, wherein R,R'R" are the same or different $C_1$–$C_{20}$ alkyl or $C_6$–$C_{20}$ aryl, preferably $C_1$ to $C_8$ alkyl or $C_6$–$C_{12}$ aryl, $Li_2Se$, $Li_2Te$, $(NH_4)_2Se$. A nonaqueous solvent such as THF, other organoethers, acetonitrile, DMF, molten sulfur, etc. may be used if running the reaction neat is impractical. The reaction which occurs may be represented by the following equation (which represents the reaction when M is a +4 metal ion):

$$MZ_4 + 2A_2X \xrightarrow[\text{solvent or neat}]{\text{nonaqueous}} MX_2\downarrow + 4\,AZ$$

wherein
M = a Group VIIb metal
A = alkali metal⊕, $NH_4$⊕, R,R'R"NH⊕, $R,R'NH_2$⊕ or other cation as defined above;
Z = convenient anion such as Cl⊖, Br⊖, I⊖, acetate⊖, carboxylate⊖, nitrate⊖, sulfate⊖, etc. as recited above;
X = sulfur, selenium or tellurium.

Any convenient source of $M⊕^{2\rightarrow⊕5}$, preferably $M⊕^4$ and $M⊕^5$ can be used. Complexes formed in solution which can be isolated as solids may be used as $M⊕^4$ sources. In some cases (such as rhenium) a pentavalent salt may be used directly because reduction of $M⊕^5$ to $M⊕^4$ occurs, for example:

$$ReCl_5 + 2.5\,Li_2S \rightarrow ReS_2 + 5\,LiCl + 0.5S$$

The free sulfur is removed by washing with solvent or by vaporization.

The Group VIIb metal salts are preferably, although not necessarily soluble in organic solvents such as THF since it is possible to conduct the reaction neat in most cases. Therefore, solution concentrations are not critical. Anions, which are envisioned as generating the metal salt, are selected from the group consisting of halides, selected from the group consisting of fluorine, chlorine, bromine and iodine, acetates, carboxylates, perfluorocarboxylates, amines, acetylacetonates, hexafluoroacetylacetonates and nitrates, sulfates, wherein in all cases, the carbonaceous moiety of the anion is a $C_1$ to $C_8$ hydrocarbon or fluorocarbon, preferably a $C_1$ to $C_3$ hydrocarbon or fluorocarbon.

Typical nonaqueous solvents which may be used when neat reactions are undesired are acetonitrile, benzonitrile, propionitrile, alkyl halides of from 1 to 20 carbon atoms, arylhalides of from $C_6$ to $C_{20}$ carbon atoms, 1,2, dimethoxyethane, diglyme, N-methylformamide, dimethylformamide, ethers of from $C_4$ to $C_8$, ammonia, molten sulfur, sulfur dioxide, ethylacetate, esters of from $C_4$-$C_8$, aromatics of $C_6$-$C_{20}$ carbons, preferably $C_6$ to $C_{12}$, most preferably benzene, pyridine, sulfolane, tributylphosphate, anhydrous acids such as formic acid, glacial acetic acid, propylene carbonate, tributylphosphate, dimethylsulfite, $C_1$-$C_{30}$ amines, preferably $C_1$-$C_{20}$, $C_5$ to $C_{12}$ alkanes, preferably $C_5$-$C_8$, such as hexane. The alkylhalides are preferably from $C_1$ to $C_5$ in size and the arylhalides are from $C_6$ to $C_{10}$ in size.

The reaction is normally but not necessarily, conducted in the absence of an excess of sulfide, selenide or telluride, although other starting materials may be present in excess. Since particle size depends on the rate of mixing of reagents, the reaction may be allowed to proceed instantly, upon total admixture of one reagent to the reaction solution yielding fine products or, upon the measured addition of small increments of one reagent to the reaction solution, the reaction not achieving totality for several days.

As previously stated, the reagents may be mixed neat, i.e. no added solvent, when this is feasible, or may be diluted with solvent. The use of solvent, therefore, is not critical to the reaction; however, when a solvent is utilized, it must be nonaqueous.

The temperature of the reaction may range from $-78°-400°$ C., preferably ambient (25° C.) to 300° C. It must be noted that any convenient temperature below 400° C. may be used, the only requirement being that the low temperature selected be above the freezing point of the nonaqueous solution used or slurry formed. These temperatures are markedly lower than those needed when preparing dichalcogenides via solid state or gas phase methods wherein reaction temperatures up to and exceeding 1000° C. are commonplace.

The products obtained from the low temperature nonaqueous precipitation technique are di- and polychalcogenide, particularly di-chalcogenides and more particularly, disulfides, and have unique properties. The products may also be stoichiometric in character. The particle size and crystallinity of these materials can be greatly varied by practicing the preparative methods of the instant invention. Small single crystals or high surface area powders which are amorphous to X-ray (i.e. give no X-ray pattern, see FIG. I) can be obtained. Lack of X-ray pattern indicates a crystallite size of less than 0.05 micron (500A) or a completely amorphous solid. Surface areas can be raised to the point where the dichalcogenide will remain suspended in solution and homogeneous dispersions created. This effect can be increased by using more polar nonaqueous solvents such as DMF propylene carbonate, or basic solvents such as pyridine which have a natural tendency to attach to the sulfur layers and cause dispersions. These same solvents are those which tend to intercalate in crystalline transition metal dichalcogenides. See Gamble et al, U.S. Pat. No. 3,766,064 for a list of such intercalation materials. Such dispersions can be gelled by proper variation of conditions or adsorbed on basic substrates such as CaO. The materials prepared by the process of the instant invention have utility as electrodes and are useful in the preparation of intercalation compounds which are then useful as lubricants and superconductors.

Particle Size and Crystallinity

The above-mentioned preparation allows one to choose between a wide range of particle size, crystallinity and surface area compounds. Solids may be prepared which have the following properties A. High surface area, small particle size and amorphous structure. Such characteristics are achieved by use of a solvent which may have the ability to form intercalation complexes with the chalcogenide. Alternatively, chalcogenides formed neat or in the absence of an intercalation solvent may be treated with an intercalate to achieve the same result. Such intercalates may be a strong Lewis base such as pyridine, ammonia, $C_1$-$C_{20}$ amines, aldehydes, ketones, amides, heterocyclic bases, anilines and ethers. The intercalated chalcogenide is then subjected to heat treating at between 75°-200° C. with pumping under vacuum when necessary to drive off the intercalating solvent leaving a high surface area, small particle size amorphous chalcogenide. Example: $ReS_2$ prepared from ethylacetate and treated at 400° C. in $H_2S$ gave a poorly defined X-ray pattern which indicates a crystallite size of at least less than 0.1 micron and a Brunauer, Emmett and Teller (BET) surface area of 50 $m^2$/gm. Treatment temperatures less than 400° C.

yield high surface areas or completely amorphous solids.

B. Low surface area, small particle size and amorphous solids.

Example: The same $ReS_2$ as mentioned in (A) if not heat treated gave an amorphous X-ray pattern and a BET surface area of 10 $m^2/gm$.

C. Homogeneous dispersions: conditions can be arranged as above so that all or part of the dichalcogenides remain in suspension as a homogeneous dispersion in solution. The solvents of choice for the preparation of such homogeneous dispersions are propylene carbonate, dimethylformamide (DMF), pyridine, acetonitrile, benzonitrile, propionitrile, 1,2 dimethoxyethane, diglyme and N-methylformamide. Such materials can be removed from solution by the addition of a basic solid such as MgO.

Example: $ReS_2$ prepared in propylene carbonate will result in a black opaque dispersion of $ReS_2$ stable for years. The $ReS_2$ may be absorbed by shaking the dispersion with MgO which results in a dark grey material when dried. Correspondingly, the original solution is clear after such treatment with the excess MgO.

D. High surface area composite Group VIIb dichalcogenide/metal oxide solids. Composite materials may be prepared with the Group VIIb di or poly chalcogenide being absorbed on a metal oxide due to the Lewis acid nature of the chalcogenide.

Example: $ReS_2/MgO$ material described in (C) above.

E. Gels and Glasses: Gels containing the Group VIIb dichalcogenides may be produced by preparation in certain amines, such as trihexylamine or by carefully removing solvent from ethylacetate solutions of $ReCl_5 + Li_2S$. The gels produced yield obsidian-like glasses when the solvents are removed. See Examples 4 and 5.

EXAMPLES

F. Materials having low surface area, moderate particle size and high crystallinity can be prepared from the high surface area amorphous materials resulting from the nonaqueous preparation procedure by annealing such materials at temperatures of over about 450° C.

EXAMPLES

All of the preparative work described was carried out either in a dry box or under a blanket of nitrogen. Both the starting metal +4 and +5 compounds and the sulfides and selenides thus produced are sensitive to moisture and oxygen, especially in finely powdered form as results from the heterogeneous precipitation methods described. All solvents were dried by standard techniques prior to use, and anhydrous reagents were always employed.

EXAMPLE 1—$ReS_2$ from $ReCl_5$ by the reaction $ReCl_5 + 2.5Li_2S \rightarrow ReS_2 + 5LiCl + \frac{1}{2}S°$.

3.64 grams of $ReCl_5$ were reacted with 2.30 grams of $Li_2S$ in 100 ml ethylacetate and allowed to stir. The black product was filtered and dried in $H_2S$ at 400° C. The product yielded an analysis for $ReS_{2.0}$:

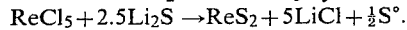

|  | Theoretical | Measured |
| --- | --- | --- |
| % Re | 74.39 | 74.40 |
| % S | 25.61 | 25.49 |

The X-ray product corresponded to $ReS_2$ and line broadening indicated a crystallite size of about $40 \times 80 A$. A BET surface area yielded 50.2 $m^2/gm$. Product before heat treatment was completely amorphous to X-rays indicating crystalline order of less than 5A, thus an amorphous solid.

EXAMPLE 2—$ReS_2$ from $ReCl_4$ by the reaction $ReCl_4 + 2Li_2S \rightarrow ReS_2 + 4LiCl$. 

In an exactly analogous manner to Example 1, $ReS_2$ was prepared from $ReCl_4$ with the same results except excess sulfur did not have to be removed by washing or heating.

EXAMPLE 3—$ReS_2$ Dispersion 2.83 grams (8 mm) of $ReCl_5$ was added to 80 ml of propylene carbonate. To this was added 0.89 grams of $Li_2S$ (19 mm) and the solution was stirred for 4 hours yielding a black liquid which was 0.1 M in $ReS_2$ and could be continuously diluted to any concentration. This black liquid passed through normal filter discs and was stable.

EXAMPLE 4—$ReS_2$ Gel

The above-described $ReS_2$ dispersion (Example 3) gelled if the concentration was greater than 0.033 M upon standing for several days.

Example 5—$ReS_2$ Glass

The above-described gel (Example 4) yielded a $ReS_2$ glass if the solvent was pumped off and the LiCl removed by washing with a suitable solvent (methanol).

Example 6—$ReS_2/MgO$ Composite

A 0.1 M dispersion of $ReS_2$ in propylene carbonate was prepared as in Example 3. 25 ml of this dispersion was contacted with 4 grams of MgO and stirred for 4 hours. The initially white solid was filtered and dried in $H_2S$ at 400° C. for 1 hour yielding a dark gray solid. The solid $ReS_2/MgO$ composite was analyzed for $ReS_2$ yielding 2.33% Re. The amount of $ReS_2$ adsorbed on the MgO can be controlled by varying stir time and concentration as shown in FIG. II.

Example 7—$ReS_2/Al_2O_3$

In a similar manner to Example 6, 6.4 grams of $Al_2O_3$ was contacted with 114 ml of 0.1 M and stirred for 6 hours. The dark gray $ReS_2/Al_2O_3$ contained 1.64% (wt) Re.

Example 8

$ReS_2$ supported on a basic oxide such as MgO according to the following procedure, Reaction (1) is an active and selective hydrodesulfurization catalyst for resid-like organosulfur molecules (i.e. dibenzothiophene)

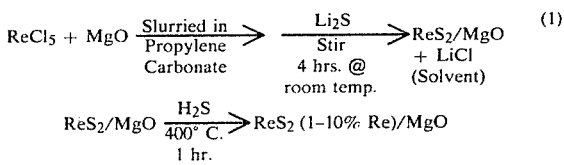

$$ReCl_5 + MgO \xrightarrow[\text{Propylene Carbonate}]{\text{Slurried in}} \xrightarrow[\text{Stir 4 hrs. @ room temp.}]{Li_2S} ReS_2/MgO + LiCl \text{ (Solvent)} \quad (1)$$

$$ReS_2/MgO \xrightarrow[\text{1 hr.}]{H_2S, 400° C.} ReS_2 (1\text{-}10\% \text{ Re})/MgO$$

In Table (1) the hydrodesulfurization activity of $ReS_2$ (2.% Re)/MgO is presented and compared to Cobalt-Moly/$\gamma$-$Al_2O_3$, CMA (JCM-468, Rt-2) at 400° C. and 450 psig, $H_2$ flow ~100 cc/min.

TABLE I

| Catalyst | cc (gm) | % M | SV (V/V/H) | Hours on Stream | Mole % x[1] BP | CHB | T | S[2] (Selectivity) |
|---|---|---|---|---|---|---|---|---|
| CMA | 5 | 10 | 2 | 165 | 62.8 | 37.1 | 99.9 | 0.63 |
|  | (3.91) |  | 0.7 | 213 | 43.9 | 55.6 | 99.5 | 0.44 |
| ReS$_2$MgO | 2.5 | 2. | 2–2.2 | 160 | 71 | 4.3 | 75.3 | 0.94 |
|  | (1.74) |  | 0.4–1 | 212 | 85 | 6 | 91 | 0.93 |

[1]
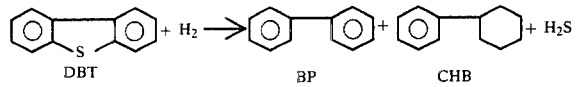
$$^2S = \frac{\text{mole \% } x_{BP}}{\text{mole \% } x_{BP} + \text{mole \% } x_{CHB}}$$

Table I indicates that under comparable conditions but with lower metal loading and less catalyst, ReS$_2$ (2.1% Re)/MgO is approximately as active as CMA at a space velocity equal to 1 V/V/H. However, ReS$_2$/MgO is much more selective toward desulfurization as evidenced by the selectivity factors. Consequently, under conditions necessary to desulfurize resid, i.e. T—400° C., P≧450 psig, SV=0.5–1 V/V/H, ReS$_2$/MgO is as active (on mole % conversion basis) as CMA but is far more selective.

EXAMPLE 9—Rhenium

ReS$_2$ was generally prepared from the pentachloride until it was discovered that the ReS$_2$ prepared from the tetrachloride was significantly more active than that prepared from the pentachloride. The preparation of ReS$_2$ may serve as a prototype for the prepartion of other Group VI, VII and VIII layered sulfides:

(a) $ReCl_5 + 2.5Li_2S \xrightarrow{\text{ethylacetate}} ReS_{2.5} + 5LiCl$ (1)

(b) $ReS_{2.5} \xrightarrow[H_2S]{400° C.} ReS_2 + S°$

The same procedure as previously outlined for RuS$_2$ was employed. If the pentachloride is used a sulfur rich product is obtained at room temperature but decomposes to the stoichiometric sulfide after treatment at 400° C. in H$_2$/H$_2$S. A typical analysis for ReS$_2$ prepared by this method is:

|  | Theoretical | Measured |
|---|---|---|
| Re | 74.39 | 74.40 |
| S | 25.61 | 25.49 |
| Total | 100.0 | 99.89 |

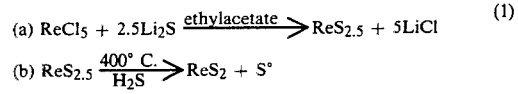
(2)

If the tetrachloride is used the stoichiometric sulfide is obtained at room temperature. The product is ReS$_2$ as shown by chemical analysis and X-ray diffraction but is significantly more active than that prepared from the pentachloride because of the difference in physical properties discussed below.

TABLE II

| Catalyst | Method of Preparation | Activity/gm (molecules DBT converted/gm-sec) |
|---|---|---|
| ReS$_2$–ReS$_{2-x}$ | Non-Aqueous Precipitation From ReCl$_5$ + Li$_2$S 15% H$_2$S/H$_2$, 25–400° C. 90 min. | .50 × 10$^{16}$ |
| ReS$_2$–ReS$_{2-x}$ | ReCl$_4$ + Li$_2$S 15% H$_2$S/H$_2$, 25–400° C. 90 min. | 164 × 10$^{16}$ |
| Re$_2$S$_7$ | NH$_4$ReO$_4$; 15% H$_2$S/H$_2$ 25–400° C. 90 min. | 3 × 10$^{16}$ |

What is claimed is:

1. Chalcogenides amorphous to X-ray having a particle size of less than 0.1 micron and a crystallite size of about 50 Å × 100 Å or less of the formula MX$_y$ wherein M is a metal selected from the group consisting of technetium and rhenium X is a chalcogen selected from the group consisting of sulfur, selenium and tellurium and y is about 1.5 to about 4.

2. Chalcogenides of the formula MX$_y$ wherein M is a metal selected from the group consisting of Tc and Re, X is a chalcogen selected from the group consisting of sulfur, selenium, tellurium and mixtures thereof and y is a number ranging from about 1.5 to about 4 prepared by mixing, at a temperature of from −78° C. to 400° C. for a time sufficient for reaction to occur, in the absence of aqueous or protic solvent, solutions of:

(A) metal salts, the metal being selected from the group consisting of Tc and Re, and
(B) sources of sulfide, selenide or telluride ions, said source being selected from the group consisting of K$_2$X, Li$_2$X, Na$_2$X, NaHX, (NH$_4$)$_2$X, LiHX, KHX, (NH$_4$)HX, (RR'NH$_2$)$_2$X, (RNH$_3$)$_2$X, (R,R'R"NH)$_2$X wherein R, R' and R" are the same or different C$_1$–C$_{20}$ alkyl or C$_6$ to C$_{20}$ aryl and X is the chalcogen selected from the group consisting of sulfur, selenium, tellurium and mixtures thereof.

3. Chalcogenides prepared as in claim 2, wherein y is 2 and X is sulfur.

4. Chalcogenides prepared by the process of claim 2, wherein the temperature of reaction is between 25° to 300° C.

5. Chalcogenides prepared as in claim 2, wherein the sources of sulfur, selenium and tellurium ions are selected from the group consisting of K$_2$S, Li$_2$S, (NH$_4$)$_2$S, Na$_2$S, NaHS, KHS, LiHS, (NH$_4$)HS, Li$_2$Se, (NH$_4$)$_2$Se, Li$_2$Te, (RNH$_3$)$_2$S, (R,R'NH$_2$)$_2$S, (R,R'R"NH)$_2$S, wherein R, R' and R" are the same or different and are selected from the group consisting of $C_1$ to $C_{20}$ alkyl and $C_6$ to $C_{20}$ aryl groups.

6. Chalcogenides of Re and Tc prepared as in claim 2 which are stoichiometric.

7. Chalcogenides prepared as in claim 2 wherein the reaction is carried out in a nonaqueous aprotic solvent selected from the group consisting of $C_4$ to $C_8$ ethers, acetonitrile, benzonitrile, acetone, pyridine, propionitrile, N-methyl-formamide, dimethylformamide, 1,2-dimethoxyethane, propylene carbonate, ammonia, $C_6$-$C_{20}$ aromatics, molten sulfur, sulfur dioxide, diglyme ethylacetate, $C_4$ to $C_5$ esters, sulfolane, dimethylsulfite, tributylphosphate, $C_1$-$C_{20}$ amines, $C_5$-$C_{12}$ alkanes, anhydrous formic acid, glacial acetic acid, $C_1$-$C_{20}$ alkyl halides, $C_6$-$C_{20}$ arylhalides.

8. Chalcogenides prepared as in claim 2 wherein the anion of the metal salt is selected from the group comprising halides, sulfates, nitrates, carboxylates and perfluorocarboxylates, wherein the carbonaceous moiety of the anion is a $C_1$ to $C_8$ hydrocarbon or fluorocarbon radical.

9. A method for the preparation of chalcogenides of the formula $MX_y$ wherein M is a metal selected from the group consisting of technetium and rhenium, X is selected from the group consisting of sulfur, selenium, tellurium and mixtures thereof, and y is a number ranging from about 1.5 to about 4, which comprises reacting, in the absence of aqueous or protic solvent, at a temperature of from $-78°$ to $400°$ C. for a time sufficient for reaction to occur, a solution of a transition metal salt, the transition metal being selected from the group consisting of manganese, technetium and rhenium, with a source of sulfide, selenide or telluride ions, said source being selected from the group consisting of $K_2X$, KHX, $Li_2X$, LiHX, NaHX, $(NH_4)_2X$, $Na_2S$, $(RNH_3)_2X$, $(R,R'NH_2)_2X$, $(R,R'R"NH)_2X$ wherein R, R' and R" are the same or different $C_1$-$C_{20}$ alkyl or $C_6$ to $C_{20}$ aryl and X is the chalcogen selected from the group consisting of sulfur, selenium, tellurium and mixtures thereof.

10. The method of claim 9 further characterized by isolating the product after the reaction occurs.

11. The method of claim 10 further characterized by the step of contacting the isolated product with an intercalating solvent, thereby forming an intercalated chalcogenide and then driving the solvent off by means of heat, thereby generating a chalcogenide of increased surface area.

12. The method of claim 11 wherein the intercalating solvent is selected from the group consisting of pyridine, ammonia, $C_1$-$C_{20}$ amines, aldehydes, ketones, amides, heterocyclic bases, and amidines, and the solvent is subsequently driven off at a temperature of between 75°–200° C.

13. The method of claim 9 wherein the product is a stoichiometric chalcogenide.

14. The method of claim 9 wherein the chalcogen is selected from the group consisting of sulfur and selenium.

15. The method of claim 9 wherein the chalcogen is sulfur.

16. The method of claim 9 wherein the product is a dichalcogenide.

17. The method of claim 9 wherein the product is a disulfide.

18. The method of claim 9 wherein the temperature of reaction is between 25° to 300° C.

19. The method of claim 9 wherein the source of sulfur, selenium and tellurium is selected from the group consisting of $Li_2S$, LiHS, NaHS, KHS, $(NH_4)HS$, $(NH_4)_2S$, $Na_2S$, $K_2S$, $Li_2Se$, $Li_2Te$, $(NH_4)_2Se$, $(RNH_3)_2S$, $(RR'NH_2)_2S$, $(RR'R"NH)_2S$ wherein R, R' and R" are the same or different and are selected from the group consisting of $C_1$-$C_{20}$ alkyl and $C_6$-$C_{20}$ aryl groups.

20. The method of claim 10 wherein the isolation step utilizes excess solvent.

21. The method of claim 10 wherein the isolation step utilizes vacuum pumping to draw off volatile by-products.

22. The method of claim 10 further characterized by including the step of annealing the isolated product at a temperature of over about 450° C. thereby generating a product having low surface area, moderate particle size and high crystallinity.

23. Homogeneous dispersions of compounds of the formula $MX_y$ wherein M is a transition metal selected from the group consisting of Re and Tc, X is selected from the group consisting of sulfur, selenium and tellurium and y is a number from about 1.5 to about 4 prepared as in claim 9 in solvents selected from the group consisting of propylene carbonate, dimethylformamide, pyridine, acetonitrile, benzonitrile, propionitrile, 1,2 dimethoxyethane, diglyme, N-methylformamide.

24. The homogeneous dispersions of claim 23 wherein the compound dispersed is $ReS_2$.

25. Compositions comprising the homogeneous dispersion of claim 23 deposited on high surface area supports, said supports being selected from the group consisting of high surface area carbon, high surface area refractory oxides.

26. The compositions of claim 25 wherein the high surface area support is selected from the group consisting of CaO, MgO, $Al_2O_3$, silica-alumina and high surface area carbon.

27. The method of claim 9 wherein the reaction is carried out in a nonaqueous aprotic solvent selected from the group consisting of $C_4$ to $C_8$ ethers, acetonitrile, benzonitrile, acetone, pyridine, propionitrile, N-methylformamide, dimethylformamide, 1,2-dimethoxyethane, propylene carbonate, ammonia, $C_6$-$C_{20}$ aromatics, molten sulfur, sulfur dioxide, diglyme, ethylacetate, $C_4$ to $C_5$ esters, sulfolate, dimethylsulfite, tributylphosphate, $C_1$-$C_{20}$ amines, $C_5$-$C_{12}$ alkanes, anhydrous formic acid, glacial acetic acid, $C_1$-$C_{20}$ alkyl halides, $C_6$-$C_{20}$ arylhalides.

28. The method of claim 9 wherein the anion of the metal salt is selected from the group comprising halides, sulfates, nitrates, carboxylates and perfluorocarboxylates wherein the carbonaceous moiety of the anion is a $C_1$ to $C_8$ hydrocarbon or fluorocarbon radical.

* * * * *